United States Patent [19]

Frank

[11] 4,225,333

[45] Sep. 30, 1980

[54] GLASS SHEET TEMPERING APPARATUS

[75] Inventor: Robert G. Frank, Murrysville, Pa.

[73] Assignee: PPG Industries, Inc., Pittsburgh, Pa.

[21] Appl. No.: 961,079

[22] Filed: Nov. 15, 1978

Related U.S. Application Data

[63] Continuation-in-part of Ser. No. 954,694, Oct. 25, 1978, abandoned.

[51] Int. Cl.$^2$ ............................................. C03B 27/00
[52] U.S. Cl. ...................................... 65/348; 65/273; 65/351
[58] Field of Search ................. 65/273, 275, 286, 287, 65/348, 349, 350, 351, 104, 114

[56] References Cited

U.S. PATENT DOCUMENTS

| | | | |
|---|---|---|---|
| 3,372,016 | 3/1968 | Rahrig et al. | 65/114 |
| 3,573,889 | 4/1971 | McMaster et al. | 65/273 X |
| 3,846,106 | 11/1974 | Seymour | 65/114 |
| 3,881,906 | 5/1975 | Ritter et al. | 65/104 |
| 4,058,200 | 11/1977 | Frank | 65/273 X |
| 4,139,359 | 2/1979 | Johnson et al. | 65/273 X |

FOREIGN PATENT DOCUMENTS

2024397  11/1971  France .

Primary Examiner—Arthur D. Kellogg
Attorney, Agent, or Firm—Dennis G. Millman; Edward I. Mates

[57] ABSTRACT

This invention relates to tempering curved, hot glass sheets supported with their concavely shaped major surfaces facing a first set of pipe-type nozzles and their convexly shaped major surfaces facing a second set of bar-type nozzle housings while tempering medium is applied simultaneously under pressure against said major surfaces.

7 Claims, 6 Drawing Figures

GLASS SHEET TEMPERING APPARATUS

RELATION TO OTHER APPLICATIONS

The present application is a continuation-in-part of application Ser. No. 954,694 of Robert G. Frank for Glass Sheet Tempering Apparatus filed Oct. 25, 1978 now abandoned.

The subject matter of the present application is related to the subject matter of the following patent applications: Ser. No. 954,697 of Robert G. Frank for Handling Glass Sheets during Shaping and Cooling; Ser. No. 954,693 of Robert G. Frank for Apparatus for Handling Glass Sheets during Shaping and Cooling; Ser. No. 954,695 of Robert G. Frank for Vacuum Mold with Uniform Release Means, and Ser. No. 954,696 of Robert G. Frank, Rudy Canonaco and Richard V. Posney for Slotted Glass Sheet Shaping Mold, all filed on Oct. 25, 1978.

BACKGROUND OF THE INVENTION

1. Field of the Invention

This invention relates to the shaping and cooling of glass sheets and particularly in the high speed production of bent glass sheets that are toughened by air quenching, and most particularly, for shaping and heat treating relatively thin glass sheets. The present invention is especially concerned with the heat treatment and, most particularly, the rapid cooling of glass sheets that are supported in an essentially horizontal disposition during said treatment, although alternate embodiments can be used for treating glass sheets supported in vertical or oblique dispositions.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact. In addition to increasing the resistance of glass sheets to breakage, tempered glass sheets, if fractured, break into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a path (usually horizontal, although vertical paths and paths having both horizontal and vertical components are also known) that extends through a tunnel-type furnace where the glass sheet is one of a series of sheets that are heated to the deformation temperature of glass and into a shaping station where each glass sheet in turn is shaped to a desired configuration. The shaped glass sheet is then moved along a horizontal or vertical path between spaced, opposed plenum chambers that dispense tempering medium, usually in the form of air blasts imparted through a first array of nozzles that face the concave surface of the shaped glass sheet and a second array of nozzles that face the convex surface of the shaped glass sheet as the latter is conveyed along said path between said spaced, opposed arrays of nozzles. The nozzle arrays are found in a cooling station.

With few exceptions, in the prior art, the first array of nozzles was arranged and constructed as identical as possible to the second array of nozzles so that each nozzle of the first array faced a corresponding nozzle of the second array and the type of nozzle (pipe or slot or "rosette" module) in any portion of the first array of nozzles was opposed by a corresponding nozzle of the same type in the second array of nozzles for either the entire cooling station or at least almost the entire length of said cooling station.

When prior art apparatus cools a shaped glass sheet that was not heated sufficiently for tempering, temporary tension stresses are established in the glass that sometimes cause breakage. The lower array of nozzles used to treat glass sheets supported in a horizontal disposition is mounted on a pivoted structure to help remove glass particles rapidly by pivoting the lower array downwardly when breakage occurs and returning the lower array to a horizontal orientation when the glass fragments are removed by sliding. Preferably, resumption of the horizontal orientation takes place before a succeeding glass sheet reaches the location of the breakage of a previous glass sheet in the cooling station.

In the past, the lower nozzles that pivoted were in the form of apertured pipes having apertures spaced along and extending through the walls thereof. Such apertured pipes did not deliver tempering medium as rapidly as pipes or slots having elongated passages to guide the movement of said tempering medium against glass sheet surfaces in directions oblique or normal to the major glass sheet surfaces, thus providing increased cooling effect on the glass surface and a higher degree of temper for a given rate of flow of tempering medium. Where the apertured pipes of both the upper and the lower array are apertured through the wall thickness of the pipes, both the upper and lower glass surfaces develop a level of temper that is less than desired when the glass sheets are quenched at a rate of flow that provides sufficient cooling to develop a barely acceptable temper when blasted at said rate of flow through elongated pipe-type or slot-type nozzles.

2. The Prior Art

U.S. Pat. No. 3,372,016 to Donald D. Rahrig et al. discloses glass sheet tempering apparatus that has opposite arrays of nozzles provided with slotted openings in a cooling station thereof. The upper array of slotted openings oppose the lower array of slotted openings.

U.S. Pat. No. 3,846,106 to Seymour provides glass sheet tempering apparatus in which glass sheets are conveyed between an upper and a lower array of apertured pipes. The apertures extend through the wall of the pipes in a radial direction. Tempering medium (air) is supplied under pressure through the pipes for release through the apertures against the opposite surfaces of a shaped glass sheet. The lower array of pipes is pivoted to facilitate removal of glass fragments if breakage occurs.

U.S. Pat. No. 3,881,906 to George F. Ritter et al. discloses glass sheet tempering apparatus comprising upper and lower arrays of nozzles for delivering tempering medium against the upper and lower major surfaces of glass sheets moving therebetween through a cooling station. The upper and lower arrays are essentially identical to one another except for the fact that the nozzles have free ends that terminate along convexly and concavely curved surfaces that are complementary to each other and match the curvature of the glass sheets transverse to the path of glass sheet travel through the cooling station. The upstream nozzles are directed obliquely away from the furnace exit and are in the form of pipes. Additional pipe type nozzles are provided that impart tempering medium in a direction normal to the horizontal plane of the path of glass sheet travel. Further downstream, both upper and lower arrays of nozzles comprise tubes that extend through thick walls of opposing air chambers. Such a construction is used to provide flat, trap-free surfaces facing the glass sheets, which facilitates removal of broken glass from the blast heads in a potentially high breakage area.

French Pat. No. 2,024,397 discloses glass sheet tempering apparatus that has an upper array of slit type nozzles opposing spaced rows of so-called "rosette" modules that provide both a source of cooling medium and a support bed for flat glass sheets conveyed through the cooling area of a glass sheet tempering apparatus.

SUMMARY OF THE INVENTION

The present invention provides apparatus for tempering glass sheets having an essentially cylindrical curvature relative to the path of glass sheet travel through a cooling station. In particular, the present invention provides a novel arrangement combining a first array of pipe-type nozzles arranged in convexly shaped rows with a second array of bar-type nozzle housings having holes drilled through thick walls of the bars in spaced relation conforming to the space between adjacent pipe-type nozzles in each upper row. An apertured bar is provided to oppose each transversely extending row of pipe-type nozzles. Each apertured bar extends transversely of the path of glass sheet travel and is longitudinally spaced from adjacent upstream and downstream apertured bars.

The apertured bars have smoothly surfaced surfaces of concave configuration and the rows of pipe nozzles have pipes that terminate at their outer ends along spaced lines curved convexly to conform to the concave shape of the apertured bars that extends relative to the path of glass sheet travel.

The present invention provides relatively more space for the escape of tempering medium that impinges against the concavely shaped glass sheet surfaces and relatively less space for the escape of tempering medium that impinges against the convexly shaped glass sheet surface as the shaped glass sheet passes between the first and second arrays of nozzles during its passage through the cooling station in an orientation wherein the shaped glass sheet presents a curvature that is essentially cylindrical transverse to the path of glass sheet movement through the cooling station.

The present invention will be described in a particular environment especially applicable for tempering curved glass sheets that move along a path of glass sheet travel with the glass sheets disposed essentially horizontally as they move between upper and lower arrays of tempering nozzles with the glass sheets oriented to present a concavely shaped configuration in elevation transverse to the path of glass sheet travel regardless of the manner by which the glass sheets are shaped or by which they are supported for travel through a cooling station. However, the present invention will also be better understood in its broader aspects involving non-horizontal dispositions of the glass sheets in the light of a description of an illustrative embodiment that follows. The description includes the accompanying drawings wherein like reference numbers refer to like structural elements.

DESCRIPTION OF THE PREFERRED EMBODIMENT

Figure 1:
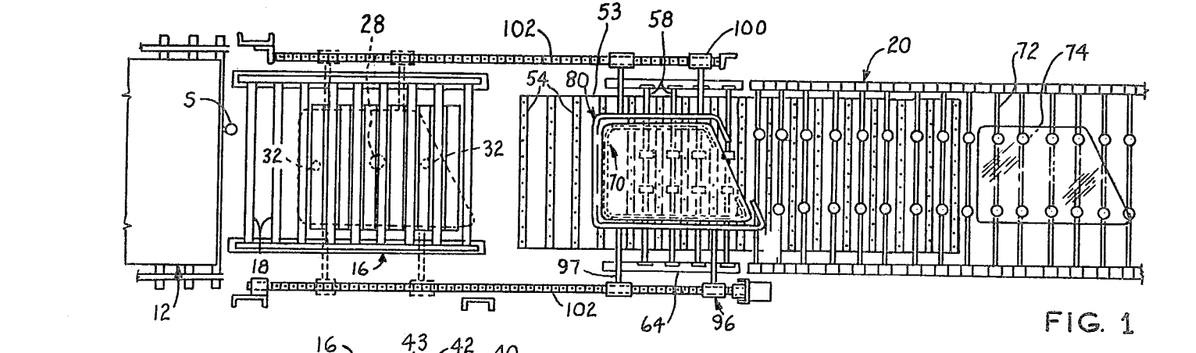
FIG. 1 is a fragmentary, plan view of apparatus for shaping and tempering glass sheets incorporating a preferred embodiment of the present invention, with certain parts omitted for clarity, showing how a cooling station is located relative to the remainder of the illustrative embodiment of said apparatus.
Figure 2:
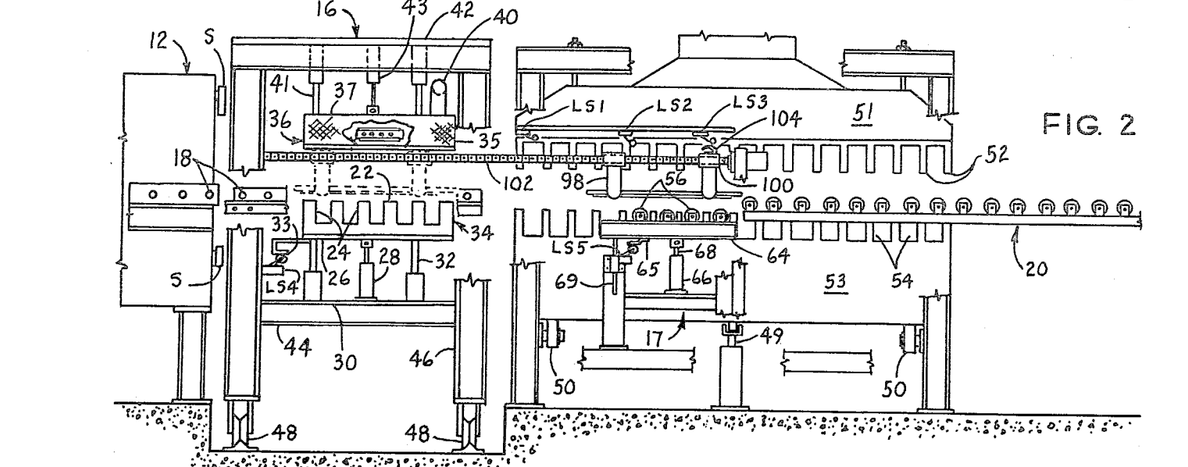
FIG. 2 is a fragmentary, longitudinal view of the embodiment of FIG. 1 with certain parts omitted or broken away or shown in inconsistent positions to show other parts of the apparatus more clearly and with certain positions depicted in phantom consistent with FIG. 1.

Referring now to FIGS. 1 and 2 of the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-5 are provided to synchronize the operation of various elements of the apparatus according to a predetermined sequence. The glass sensing element S, the limit switches LS-1 through LS-5 and various timer circuits actuated thereby cooperate to provide synchronizing means for the apparatus of the present specification.

The shaping station 16 comprises a lower shaping mold 34 and an upper vacuum shaping mold 36. The latter is composed of metal covered with a refractory material such as fiber glass 35 as is well known in the art. The former comprises an upper surface 22 conforming in elevational shape to the shape desired for a glass sheet to be bent. The upper surface 22 is interrupted by intermittent transversely extending grooves 24 which provide clearance for raising and lowering the lower shaping mold 34 between a recessed position below the conveyor rolls 18 and an upper position above the level of said conveyor rolls. The lower shaping mold 34 is fixed to a lower mold support 26 and readily detachable therefrom to substitute a mold 34 for a different production pattern.

The upper surface 22 of the lower shaping mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston 28 rigidly mounted to a piston support platform 30 raises and lowers support 26 and its attached lower shaping mold 34. Alignment posts 32 are attached to mold support 26 to assure vertical movement of the lower mold 34. A lug 33 is connected to mold 34 to actuate limit switch LS-4.

The upper vacuum mold 36 has an upper mounting plate 37 and a lower wall 38 that is apertured, as well as side walls 39, at least one of the latter being apertured. The lower wall 38 is shaped to be complemental to the shaping surface formed by the upper surface 22 of the lower shaping mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relative thereto by an upper vertical piston 43. The upper vacuum mold 36 is readily detached from its upper mounting plate 37 to permit rapid substitution of another upper vacuum mold 36 conforming to a different production pattern. The evacuation pipe 40 may be connected through a suitable valve arrangement to a source of pressurized air (not shown) and the valves for the vacuum line and for the pressure line may be synchronized according to a predetermined time cycle in a manner well known in the art.

Any portion of a side wall 39 of the upper vacuum shaping mold 36 that contains apertures is also provided with an apertured slide 60 having a tab 61 at one end thereof. The apertured slide 60 has apertures corresponding in size, shape and space therebetween to the arrangement of the apertures in apertured wall 39 and is movable along said apertured wall 39 to occupy a position in which its apertures are completely aligned with the apertures in apertured side wall 39 to provide a maximum effective open area for the side wall 39, and to occupy another position in which its apertures face the spaces between the apertures in the apertured side wall 39 so as to enable side wall 39 to behave in the same manner as a continuous side wall with no effective open area. It is understood that the slide 60 may be adjusted in any position in which its apertures are partially aligned with the apertures of the apertured side wall 39 or in which only one or more of its apertures are partially or completely aligned with one or more apertures of the apertured side wall 39 to provide a desired amount of effective open area in the side wall 39 and means for adjusting the amount of open area as needed.

The reason for providing apertures 59 in at least one of the side walls 39 and an apertured slide 60 therefor is to insure that a glass sheet G drops uniformly onto a ring-like member 70 (to be described later) when the latter is located below the upper vacuum shaping mold without tilting from the orientation at which it is engaged against the apertured lower wall 38 of upper vacuum shaping mold 36 when vacuum is released from the latter. The ring-like member 70 supports the glass sheet for movement from the shaping station 16 into the cooling station 14.

The apertures in the apertured lower wall 38 are made as small as possible to minimize distortion of a heat-softened glass sheet supported thereagainst by suction, and are spaced as closely as is necessary to assure vacuum support for a hot glass sheet with reasonable energy consumption. For an upper vacuum mold having a glass sheet engaging apertured lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm.). Five apertures, each having a diameter of one inch (25.4 mm) spaced apart on 2.2 inch (56 mm) centers are sufficient for the apertured slide 60 and the corresponding row of apertures in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

Figure 4:
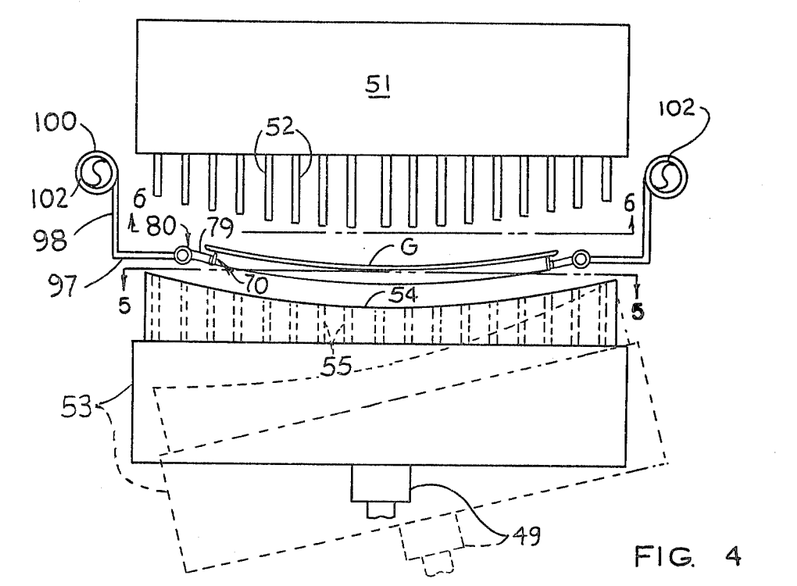
FIG. 4 is an end elevation of the cooling station taken in full lines across its entrance at a time when the ring-like member is crossing said entrance, and showing in phantom an oblique position assumed by a lower set of bar-type nozzles in order to dump cullet rapidly.
Figure 5:
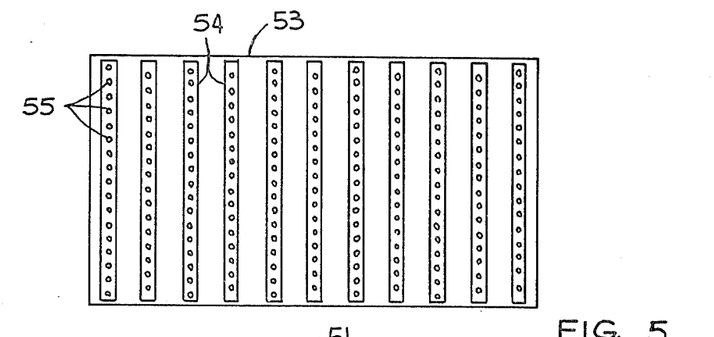
FIG. 5 is a plan view of the set of bar-type lower nozzles taken along the line 5—5 of FIG. 4.
Figure 6:
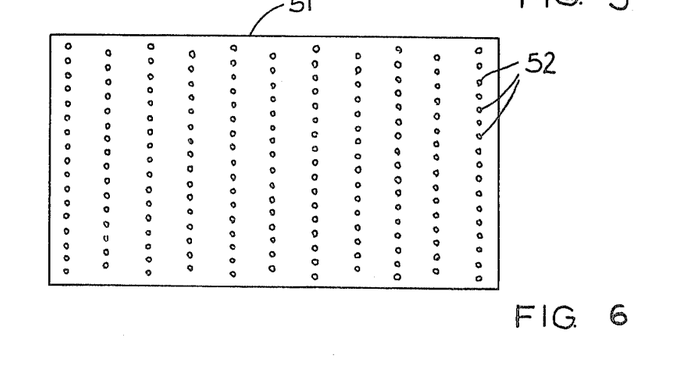
FIG. 6 is a bottom view looking up at the bottom of a set of upper pipe nozzles taken along the line 6—6 of FIG. 4.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness dimension so that air applied under pressure to the lower plenum 53 is directed upward through the elongated openings 55 against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housings 54 are smoothly surfaced and parallel to one another to provide discontinuous smooth surfaces on which glass cullet is deposited when a glass sheet fractures in the cooling station 14. The lower bar-type nozzle housings 54 are interconnected by a pivotally mounted frame 50 that pivots about an axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzle housings 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because it is more difficult to remove air applied normally against a concave surface than air applied normally against a convex surface and therefore more escape space is provided to remove air blasts that impinge against the upper concave surface than for air blasts that impinge against the lower convex surface.

The pipe nozzles 52 in an illustrative embodiment of this invention are $\frac{3}{8}$ standard black iron pipe nipple. Such nozzles have an inner diameter of one-half inch (12.7 millimeters) and a wall thickness of one-eighth inch (3.1 millimeters). In each transversely extending row, the upper pipe nozzles 52 are spaced from one another a center to center distance of 1.25 inches (31.75 millimeters) along the length of each row. The rows of pipes are spaced from one another a distance such that the transverse center line of each row of pipes is longitudinally spaced from the transverse center line of each adjacent row of pipes by 1.25 inches (31.75 millimeters). The individual pipes along each row are offset transversely from corresponding pipes of each adjacent row relative to the path of glass sheet travel through the cooling station 14 by a lateral offset distance of $\frac{5}{8}$ inch (15.9 millimeters).

The elongated openings 55 in the lower bar-type nozzle housings 54 have the same cross-sections and spacing from adjacent openings 55 as the upper pipe nozzles 52. Thus, the upper array of openings provided by the upper pipe nozzles 52 is opposed by an identical lower array of openings provided by the elongated openings 55 that extend through the thick upper walls of the lower bar-type nozzle housings 54.

The vertical spaces between the lower ends of the upper pipe nozzles 52 and the upper ends of the elongated openings 55 are essentially equal when the lower plenums 53 are in operative position. Means (not shown) is provided for adjusting the vertical positions of the upper plenum 51 and the lower plenum 53 to adjust the vertical spacing therebetween and the relative distance from the ends of the nozzles or openings to the adjacent glass sheet surface. The optimum vertical distance between the lower end of each pipe nozzle 52 and the upper end of the elongated opening 55 opposite thereto depends on the thickness and shape of glass sheet to be cooled, the amount of pressure and volume of tempering medium available, the temperature and heat transfer coefficient of the tempering medium, the glass temperature and temperature gradient through the glass thickness and several other factors well known to those skilled in the glass tempering art. Generally, the distance can be adjusted from a minimum of about 3 inches (76 millimeters) to a maximum in excess of 6 inches (152 millimeters). The path of glass travel is usually approximately midway of this vertical distance, although, if desired, this arrangement can be modified to have the glass closer to either the upper pipe nozzles 52 or to the upper ends of the elongated openings 55.

The upper pipe nozzles 52 may be provided with silicone rubber extensions fitted onto the lower ends of each metal tube to adjust the upper pipe nozzle to its proper length so that the elevational configuration at the lower ends of the upper pipe nozzles 52 transverse to the path of glass sheet movement conforms in elevation to the shape of the glass sheets transverse to said path of glass sheet travel through the cooling station 14.

In a typical embodiment of the present invention used for fabricating bent and tempered automobile backlights for automobiles having a length of about 70 inches (1778 millimeters) and a depth of bend of 1.5 inches (38.1 millimeters), the upper, downwardly directed pipe nozzles 52 have a length ranging from 4 inches (101.6 millimeters) at the ends to 5.5 inches (139.7 millimeters) in the central portions and the opposing, lower, upwardly directed, elongated openings 55 have a length ranging from 7.5 inches (190.5 millimeters) at the ends to 6 inches (152.4 millimeters) in the central portion. Typical air pressures applied against the opposite surfaces of a glass sheet having a nominal thickness of $\frac{1}{8}$ inch (3 millimeters) are 30 ounces per square inch (12,900 pascals) against the upper concave glass sheet surface and 21 ounces per square inch (9000 pascals) against the lower convex glass sheet surface.

Figure 3:
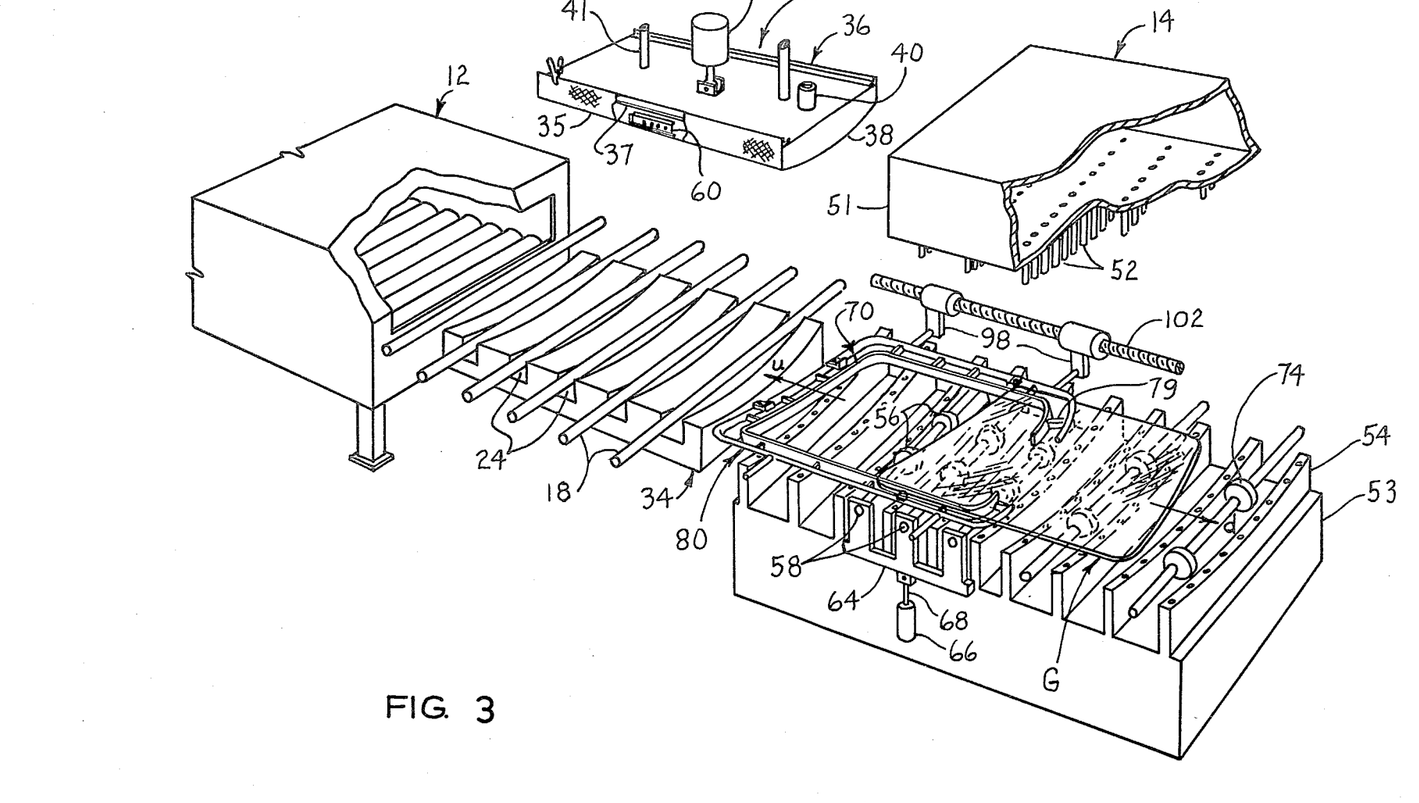
FIG. 3 is a fragmentary, perspective, partly schematic view looking upstream of the apparatus from one side of sheet transfer means forming part of said apparatus, showing a ring-like member returning upstream to a shaping station while a glass sheet moves downstream into a downstream conveyor, with certain parts omitted to show other parts more clearly.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced at equal distances from one another along the length of the downstream conveyor 20 and the additional doughnut rolls 74 are rigidly supported with their common upper tangent occupying a horizontal plane slightly above the uppermost surface of ring-like member 70.

The ring-like member 70 comprises a rail that extends in the form of a ring-like structure disposed edgewise with its width forming the height of the rail. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. Both the ring-like member 70 and the reinforcing frame 80 have open portions at their downstream ends.

The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 70 between an upstream position at shaping station 16, a downstream position in alignment with sheet transfer means 17 and an intermediate position just downstream of the shaping station. The carriage 96 is reinforced by several arcuate cross braces (not shown) shaped to conform with the transversely curved shape defined by the upper surfaces of the lower bar-type nozzle members 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and its supported ring-like member 70 relative to one of the three positions of rest occupied by the ring-like member 70 during a cycle of operation. Limit switches LS-1, LS-2 and LS-3 are provided for actuation by a lug 104 attached to the carriage 96 to control different steps in a cycle of movement of the ring-like member 70 to be explained subsequently.

CYCLE OF OPERATION

When a glass sheet G has arrived at a position in the shaping station 16 in spaced alignment between the lower shaping mold 34 and the upper vacuum mold 36, the ring-like member 70 is returning in an upstream direction toward the shaping station 16.

The glass sheet G is then engaged simultaneously between molds 34 and 36, sensing means S having actuated a timer that stops the glass sheet G in a proper position at the shaping station 16 a predetermined time interval after having sensed the presence of a glass sheet passing through the exit of the furnace 12. Vacuum is supplied to the vacuum chamber of upper vacuum mold 36 to hold the shaped glass sheet G against the apertured lower wall 38 of the upper vacuum mold 36 so that the glass sheet will remain in contact with said apertured lower wall 38 when lower shaping mold 34 is retracted. The lower shaping mold 34 has been lifted in response to the sensor S actuating a timer circuit (not shown) that extends the piston 28 on sensing the passage of a glass sheet G into the shaping station 16. Limit switch LS-4 is released by the lifting of mold 34 to actuate the vacuum for upper vacuum mold 36 and to actuate a timer that controls the onset of the return of the lower shaping mold 34 to its recessed position.

Lower shaping mold 34 then retracts, thereby resetting limit switch LS-4, and also retracting the upper vacuum mold 36 with suction still applied to hold the glass sheet thereagainst. The shaping station is now ready to receive the ring-like member 70 into position beneath the upper vacuum mold 36. When lug 104 engages limit switch LS-1, the ring-like member 70 is stopped at its aforesaid upstream position.

At the same time, limit switch LS-1 releases the vacuum in upper vacuum mold 36, thereby permitting glass sheet G to be deposited onto a ring-like member 70 when the latter occupies its upstream position.

The glass sheet G supported on the ring-like member 70 is transferred to the cooling station 14 and rapidly transferred from the ring-like member 70 to the downstream conveyor 20. In order to accomplish this end, the doughnut rolls 56 are raised in unison to lift the glass sheet G off the ring-like member 70 while rotating in unison in a direction that propels the glass sheet in a downstream direction.

FIG. 3 shows the cooled glass sheet G transferring from the doughnut rolls 56 of the sheet transfer means 17 in a downstream direction depicted by the arrow d to the doughnut rolls 74 of the downstream conveyor 20 while the ring-like member 70 is simultaneously beginning to return in an upstream direction depicted by the arrow u toward the intermediate position immediately downstream of the shaping station 16 in case a succeeding glass sheet G has not as yet been engaged by suction by the upper vacuum shaping mold 36. The ring-like member 70 moves directly into the upstream position at the shaping station 16 should the succeeding glass sheet be already supported by suction against the upper vacuum mold 36 and the lower shaping mold 34 has moved down to a vertical position sufficiently low to provide clearance for the ring-like member 70 to move to below mold 36 without stopping.

The glass sheet G supported on the ring-like member 70 moves downstream between the upper pipe-type nozzles 52 aligned in transverse rows having convexly curved downward ends and the lower apertured, bar-type nozzle housings 54 having complementary, concavely curved upper surfaces and air is blasted through the nozzles 52 and 54. The doughnut rolls 56 and their thin shafts 58 at sheet transfer means 17 remain in the downward retracted position with frame 64 being retracted downwardly by the retraction of the piston rods 68 actuated by elevator means 66 while awaiting the arrival of the ring-like member 70 into position wherein lug 104 engages limit switch LS-2.

By the time the worm drive 102 has driven carriage 96 and its supported ring-like member 70 part-way into the sheet transfer means 17, a timer circuit actuated by lug 104 engaging limit switch LS-2 in the downstream direction has caused the elevator means 66 to raise the pistons 68, thereby lifting frame 64, shafts 58 and rotating doughnut rolls 56 into intermediate positions approaching the level at which they lift the glass sheet G off the ring-like member 70. This upward movement releases limit switch LS-5, thereby causing doughnut rolls 56 to start to rotate.

When the ring-like member 70 has arrived at its most downstream position where lug 104 has engaged limit switch LS-3 to stop the worm drive 102, the rotating doughnut rolls 56 have begun to transfer the glass sheet G over the ring-like member 70 and its open-ended reinforcing frame 80 toward the most upstream doughnut roll 74 of the downstream conveyor 20. The piston rod 68 remains fully extended as the glass sheet G continues to move downstream further into the downstream conveyor 20.

Before the trailing edge of the glass sheet G has cleared the open downstream end of the ring-like member 70, the worm drive 102 has begun to move the ring-like member upstream toward the shaping station 16. A timer actuated by limit switch LS-3 controls the onset of the reverse rotation of the worm drive 102 that controls the return movement of the ring-like member 70 in an upstream direction.

When the rolls 56 have transferred the glass sheet G to the doughnut rollers 74 fixed to additional conveyor shafts 72 of the downstream conveyor 20, another timer circuit controlled by limit switch LS-3 causes the elevator means 66 to start to retract the piston rods 68, thereby lowering the doughnut rolls 56 and their thin shafts 58. Previously, the lowering of lifting frame 64 to its recessed position actuated limit switch LS-5, which caused the worm drive to move the carriage 96 in an upstream direction into a position where lug 104 engaged limit switch LS-1, thereby permitting ring-like member 70 to be in its intermediate position to await the completion of the shaping of a succeeding glass sheet which is indicated by the resetting of limit switch LS-4 when lower shaping mold 34 retracts. However, if the apparatus operates rapidly enough, as indicated by the time-out of a timer circuit whose time starts by a subsequent actuation of sensing means S, the reset limit switch LS-4 permits ring-like member 70 to move upstream through the intermediate position without stopping at the intermediate position.

During the time that the ring-like member moves into or through the intermediate position controlled by the engagement of lug 104 against limit switch LS-1, lower shaping mold 34 remains retracted sufficiently to provide clearance for the succeeding glass sheet G to enter into a position of alignment between the upper vacuum mold and the lower shaping mold 34.

It is preferred that the thin shafts 58 on which the doughnut rolls 56 are mounted by rotating when the set of rolls 56 is lifted into position above that occupied by the lower surface of the glass sheet G resting on the ring-like member 70. The rolls 56 may rotate continuously or intermittently. In the latter case, it is imperative that the rolls 56 rotate during the portion of their cycle of vertical movement when they engage the lower surface of a glass sheet being transferred.

In order to avoid marking the glass during its transfer from the set of doughnut rolls 56 to the rotating additional doughnut rollers 74 fixed for rotation to the additional conveyor shafts 72, the peripheral speed of the vertically movable rolls 56 located at the sheet transfer means 17 is equal to the peripheral speed of the doughnut rolls 74 of the downstream conveyor 20. In addition, the glass sheet G is cooled rapidly enough while resting on the ring-like member 70 to at least harden its surfaces sufficiently to enable the latter to withstand rolling contact with said rotating rolls 56 without developing substantial surface defects that would cause the resulting glass articles to be rejected by a customer. Preferably, the cooling is performed at a rate sufficient to impart at least a partial temper to the glass sheet before lifting the latter onto said rotating rolls.

Glass sheets of non-rectangular outline transported along a long roller conveyor extending through a furnace tend to become misaligned and misoriented. However, the orientation and alignment of glass sheets may be readily corrected by using the method and apparatus for orienting and aligning glass sheets adjacent to the downstream exit of the furnace described and claimed in U.S. Pat. No. 4,058,200 to Robert G. Frank.

The present invention permits each glass sheet in a series of sheets that is conveyed on a relatively inexpensive roller-type conveyor while it is heated to its deformation temperature, then shaped to the desired configuration at the shaping station using complementary shaping molds and then deposited onto an outline support surface provided by a ring-like member so that the shaped glass sheet G is supported adjacent its marginal edge only on said ring-like member with its upper and lower major surfaces exposed to blasts of cool tempering medium, such as air or any other suitable well-known tempering medium, during the conveyance of the shaped glass sheet G to a sheet transfer means 17 that transfers the shaped and tempered glass sheet G to a downstream conveyor that leads to an unloading station, as described in the illustrative embodiment just recited, can be tempered more uniformly between the upper and lower major surfaces despite the concave shape of one and the convex shape of the other because of the greater volume of escape paths facing the concave glass sheet surfaces and lesser volume of escape paths facing the convex glass sheet surfaces.

The form of the invention shown and described in this disclosure represents an illustrative preferred embodiment thereof. It is understood that various changes may be made in the structure and method of operation of glass shaping and tempering apparatus that includes the specific upper and lower nozzle arrangement and various changes in spacing between nozzles, cross-sectional areas of nozzles and other dimensional variations. While the best mode of this invention has been described in connection with horizontally disposed glass sheets forming a transversely curved configuration of concave elevation, it is understood that this invention also operates to cool horizontally disposed glass sheets whose transverse curvature is of convex elevation wherein pipe type nozzles are disposed to face the lower glass sheet surface of concave configuration and nozzle housings of the type described face the upper, convexly curved glass sheet surface. Also, for treating glass sheets disposed obliquely or vertically, rows of pipe-type nozzles are arranged to face the side surface of the glass sheets that are concave and the nozzle housings are arranged to face the side surfaces of the glass sheets that are convex. The various embodiments of this invention may be used to apply tempering medium against the opposite surfaces of glass sheets that move in a non-horizontal path of travel as well as those that move in a horizontal path of travel. All these changes can be made without departing from the gist of the invention except insofar as defined in the claimed subject matter that follows.

I claim:

1. Apparatus for tempering a shaped glass sheet having a generally convex major surface and a generally concave opposite major surface, comprising: a first array of spaced apart pipe nozzles directed toward a curved sheet receiving space and in communication with a source of pressurized tempering medium, each of the pipe nozzles in the first array terminating in a curved plane substantially parallel to the concave major surface of the glass sheet, the first array providing relatively unimpeded escape for spent tempering medium from the vicinity of the first array; a second array of nozzles directed toward and on the opposite side of the curved sheet receiving space from the first array and in communication with a source of pressurized tempering medium, each of the nozzles of the second array comprising orifices extending through a solid member facing the glass sheet receiving space, each of the nozzles in the second array terminating in a curved plane substantially parallel to the convex major surface of the glass sheet, the solid members of the second array providing extended surfaces among the orifices adapted to impede the escape of spent tempering medium from the vicinity of the second array relative to the escape from the first array, whereby tempering conditions on both sides of the curved sheet receiving space are substantially equalized; and means for conveying a heated shaped glass sheet into the sheet receiving space.

2. The apparatus of claim 1 wherein said second array includes a plurality of said solid members extending in spaced-apart parallel relationship along the glass sheet receiving space.

3. The apparatus of claim 1 wherein the first and second arrays include substantially equal numbers of nozzles directed toward the glass sheet receiving space.

4. The apparatus of claim 1 wherein the glass sheet receiving space is substantially horizontal and the first array of nozzles is located above the glass sheet receiving space and the second array of nozzles is located below the glass sheet receiving space.

5. The apparatus of claim 4 wherein the second array of nozzles is pivotally supported in order to facilitate removal of glass fragments.

6. The apparatus of claim 1 wherein the nozzles in both the first and second arrays are uniformly spaced and have uniform cross-sections.

7. The apparatus of claim 6 wherein each nozzle of the first array is directly opposite a nozzle in the second array.

* * * * *